(No Model.) 7 Sheets—Sheet 1.

J. C. CHAMBERS.
ELECTRICAL MEDICAL APPARATUS.

No. 445,636. Patented Feb. 3, 1891.

WITNESSES
William A. Wright
Albion P. Gowman

INVENTOR
Josephus C. Chambers (No Model.) 7 Sheets—Sheet 2.

J. C. CHAMBERS.
ELECTRICAL MEDICAL APPARATUS.

No. 445,636. Patented Feb. 3, 1891.

WITNESSES
William C. Height
Albion P. Gowman

Josephus C. Chambers
INVENTOR

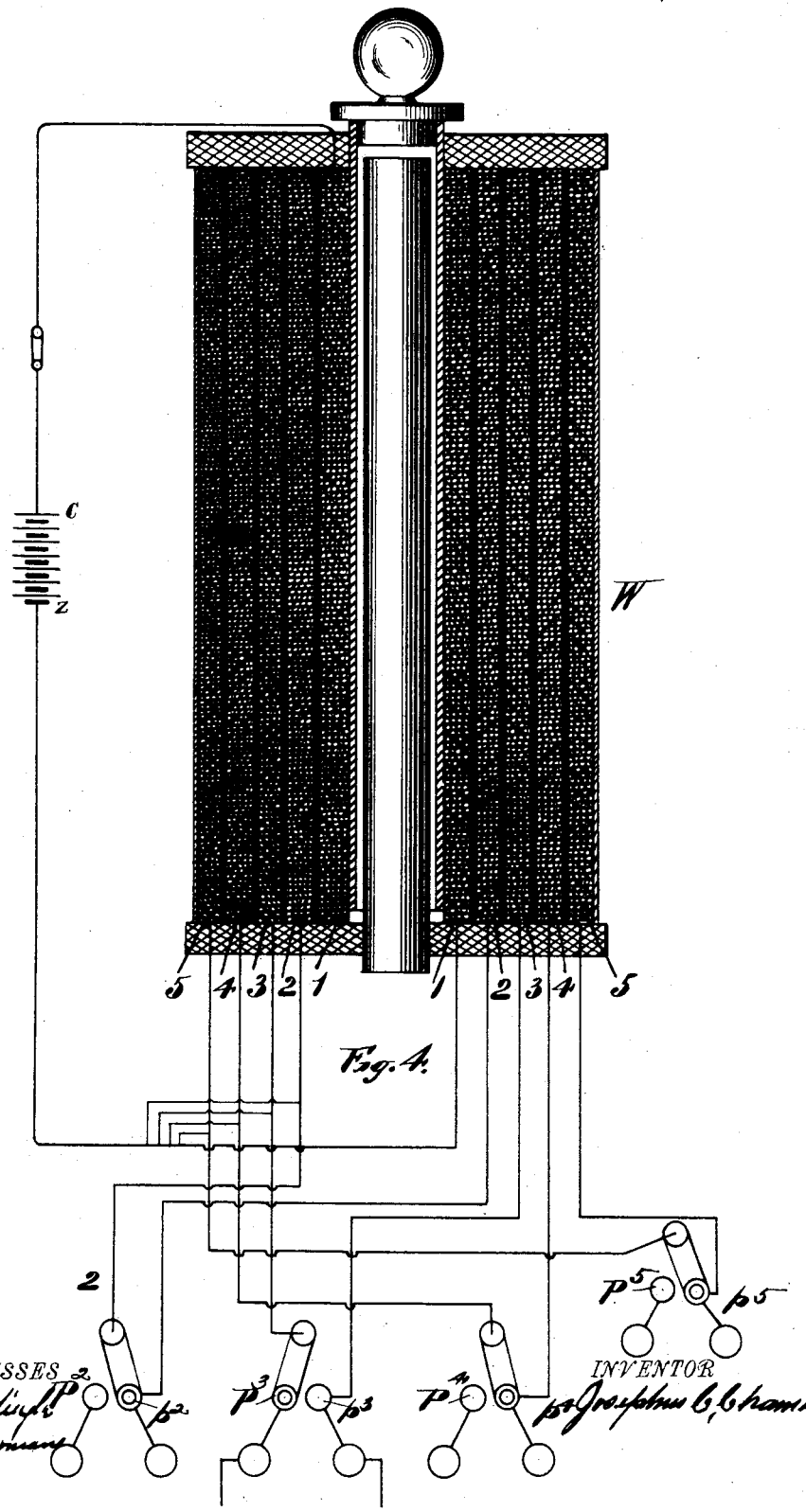

(No Model.) 7 Sheets—Sheet 4.
J. C. CHAMBERS.
ELECTRICAL MEDICAL APPARATUS.
No. 445,636. Patented Feb. 3, 1891.
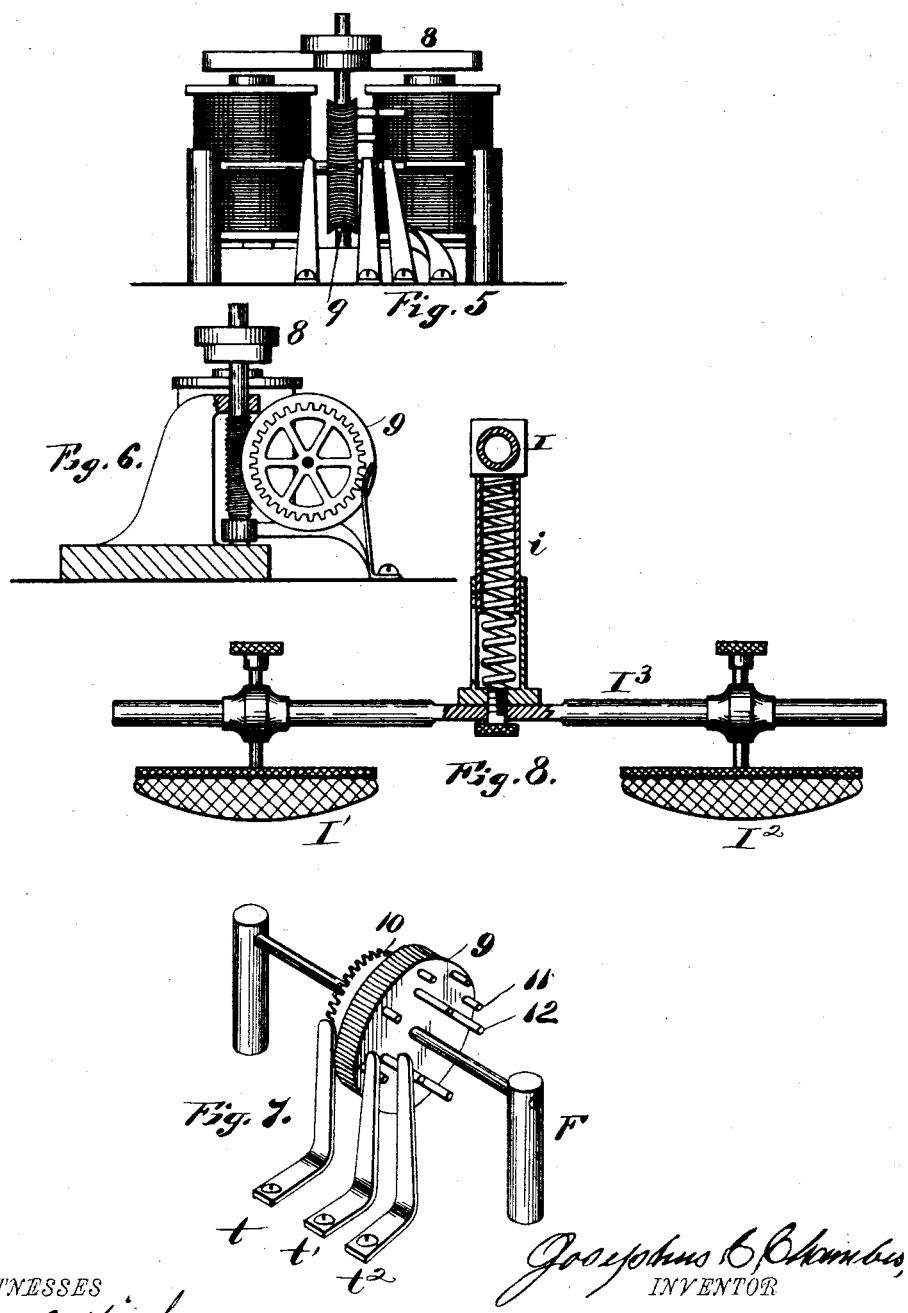

(No Model.) 7 Sheets—Sheet 5.

J. C. CHAMBERS.
ELECTRICAL MEDICAL APPARATUS.

No. 445,636. Patented Feb. 3, 1891.

WITNESSES
William A. Neight
Albion P. Gowman

INVENTOR
Josephus C. Chambers

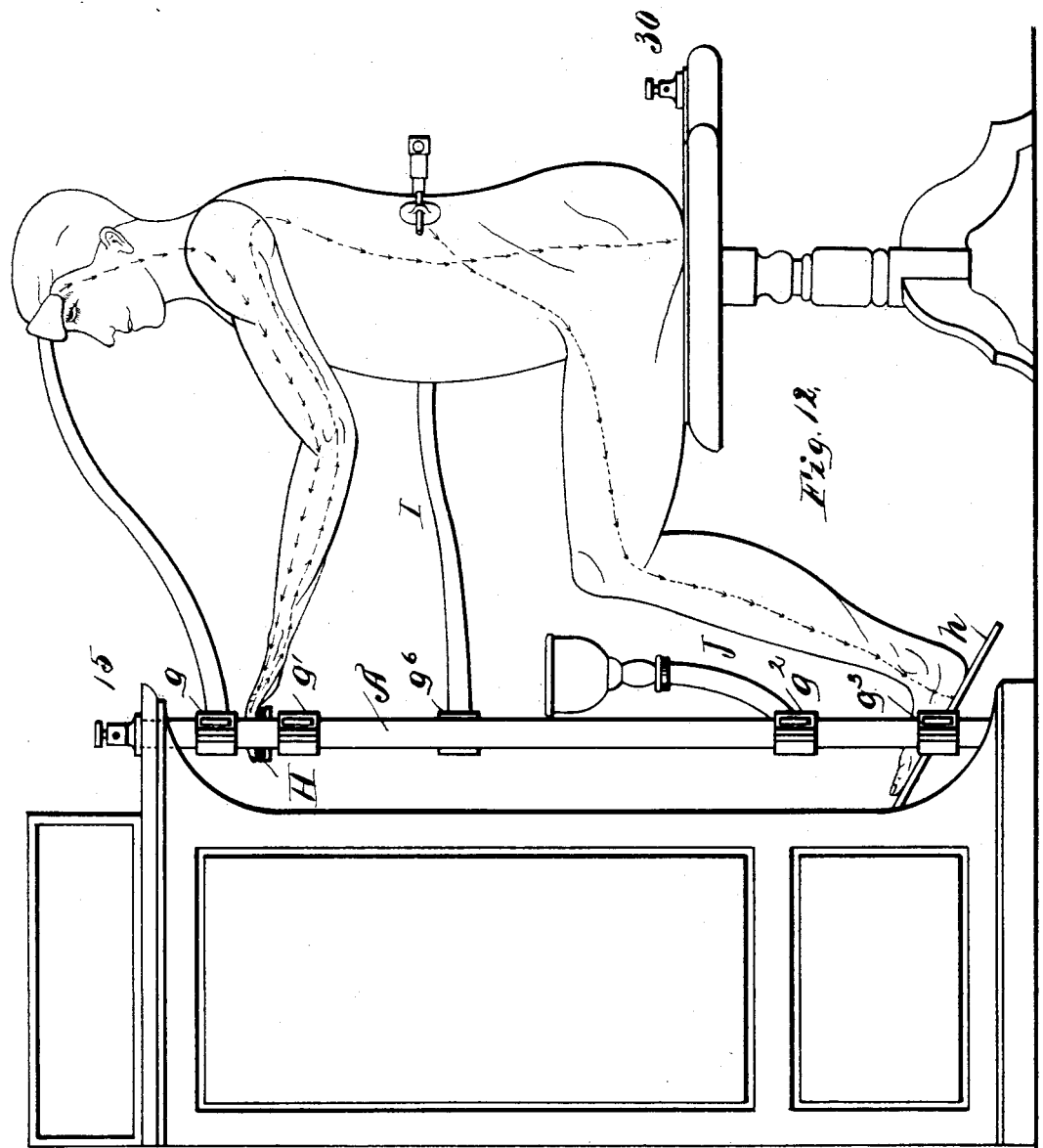

(No Model.)
7 Sheets—Sheet 7.
J. C. CHAMBERS.
ELECTRICAL MEDICAL APPARATUS.
No. 445,636.      Patented Feb. 3, 1891.
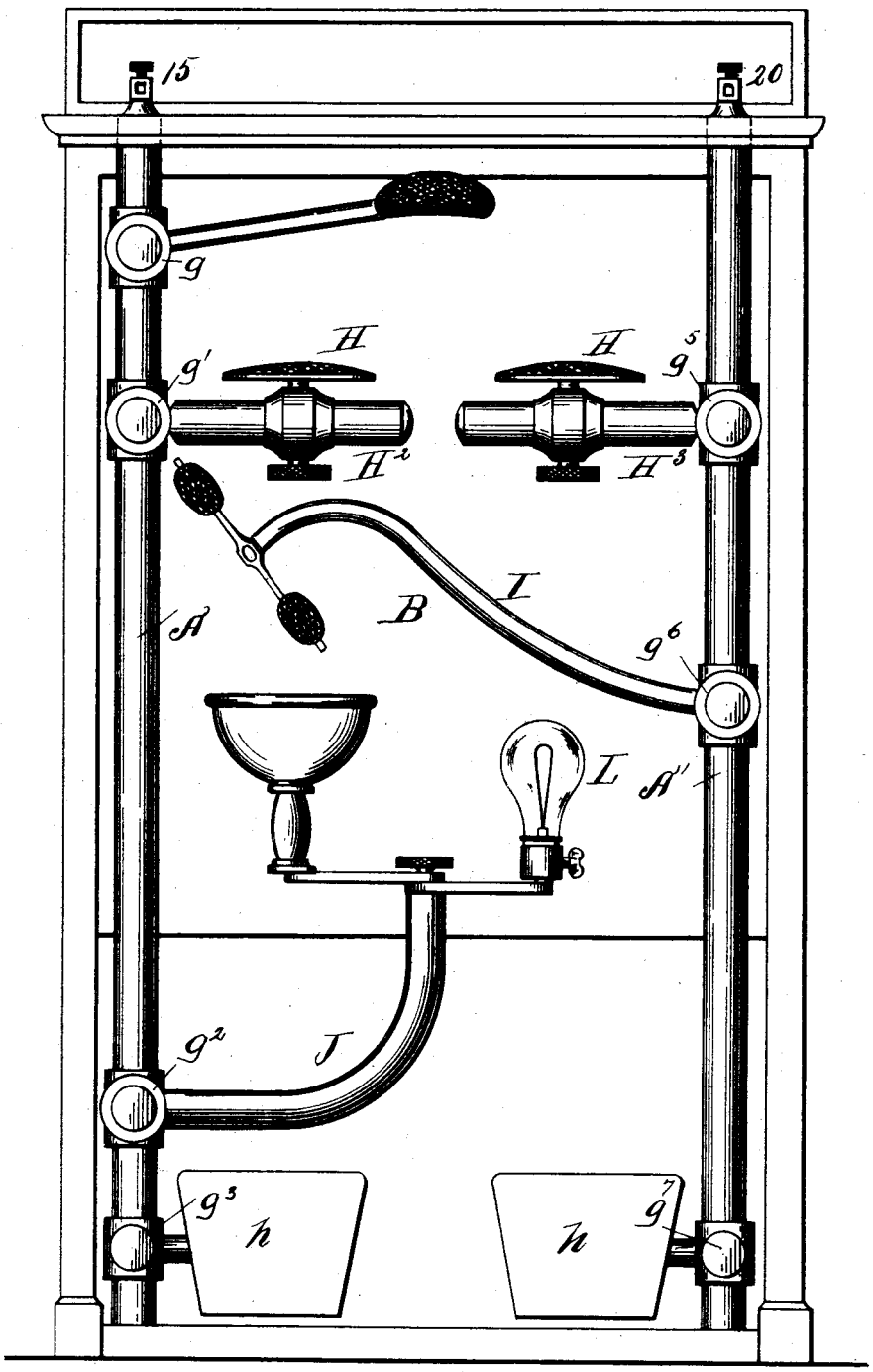
WITNESSES     Fig. 13.     INVENTOR

UNITED STATES PATENT OFFICE.

JOSEPHUS C. CHAMBERS, OF DETROIT, MICHIGAN.

ELECTRICAL MEDICAL APPARATUS.

SPECIFICATION forming part of Letters Patent No. 445,636, dated February 3, 1891.

Application filed April 21, 1890. Serial No. 348,911. (No model.)

*To all whom it may concern:*

Be it known that I, JOSEPHUS C. CHAMBERS, a citizen of the United States, residing at Detroit, in the county of Wayne and State of Michigan, have invented a new and useful Improvement in Electrical Medical Apparatus, of which the following is a specification.

This invention relates to electrical medical appliances, and has for its object the production of a device by means of which electrical currents, either continuous or interrupted, and either the current of low electromotive force of the primary or direct current or those of higher electro-motive force or induced or secondary current of different strengths, may be employed under the supervision of one skilled in employing electricity medically. These appliances are arranged in a convenient and compact form, and for use are gathered into and upon a box or cabinet of ornamental appearance, which serves as a case, within which are stored the cells of a galvanic battery sufficient in number to produce the requisite quantity of electric current. On the top of the case I arrange a switch-board, and on the front side is a standard supporting the various arms and contact-pieces used in applying the current locally to the patient.

Accompanying the cabinet and forming a part of the apparatus is a chair or seat upon which the patient sits while undergoing treatment. This may be a simple stool having a metallic seat or it may be a chair of a more complex form.

The general organization of my apparatus is shown in the accompanying figures, in which—

Figure 1:
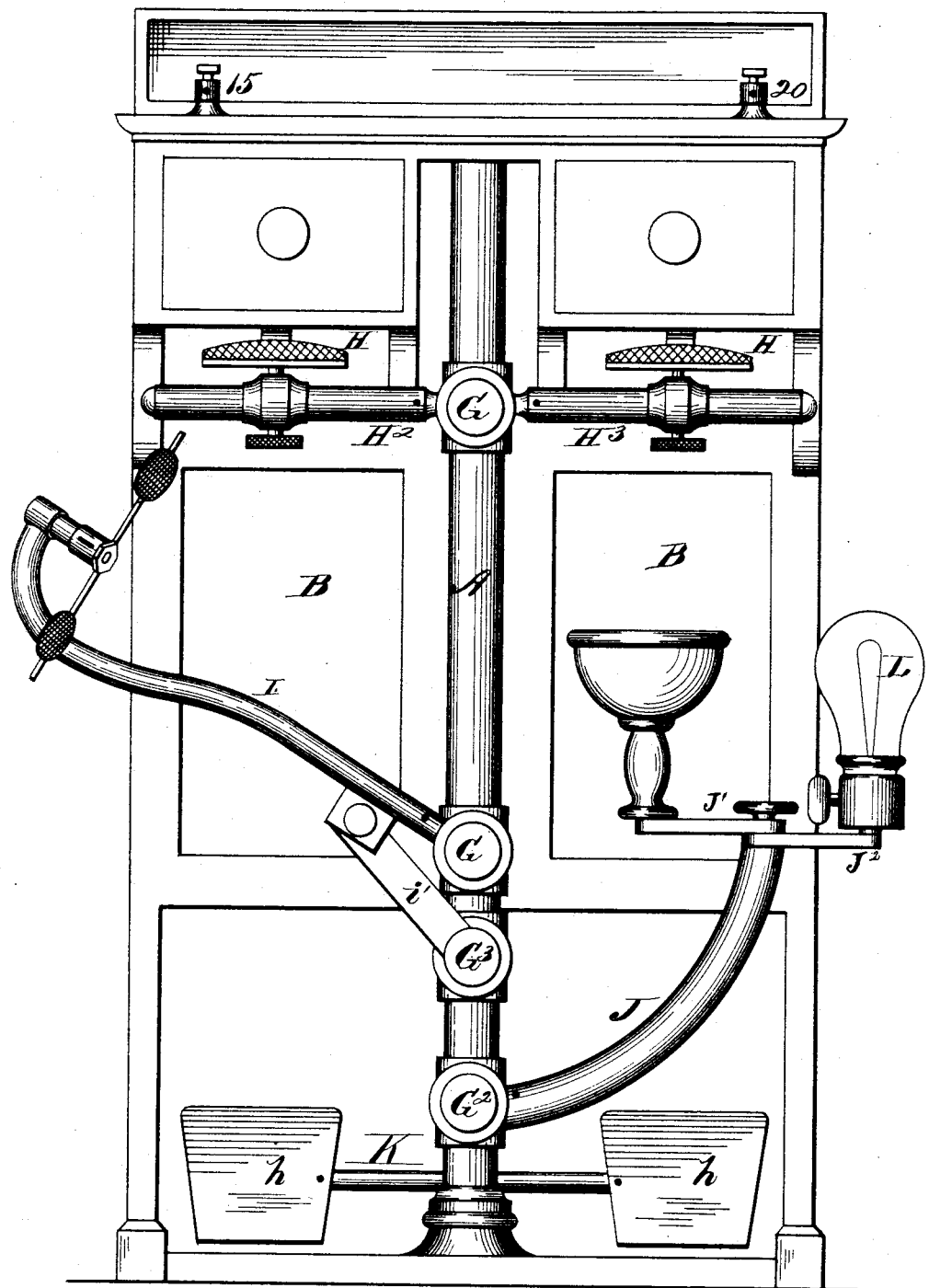
Figure 2:
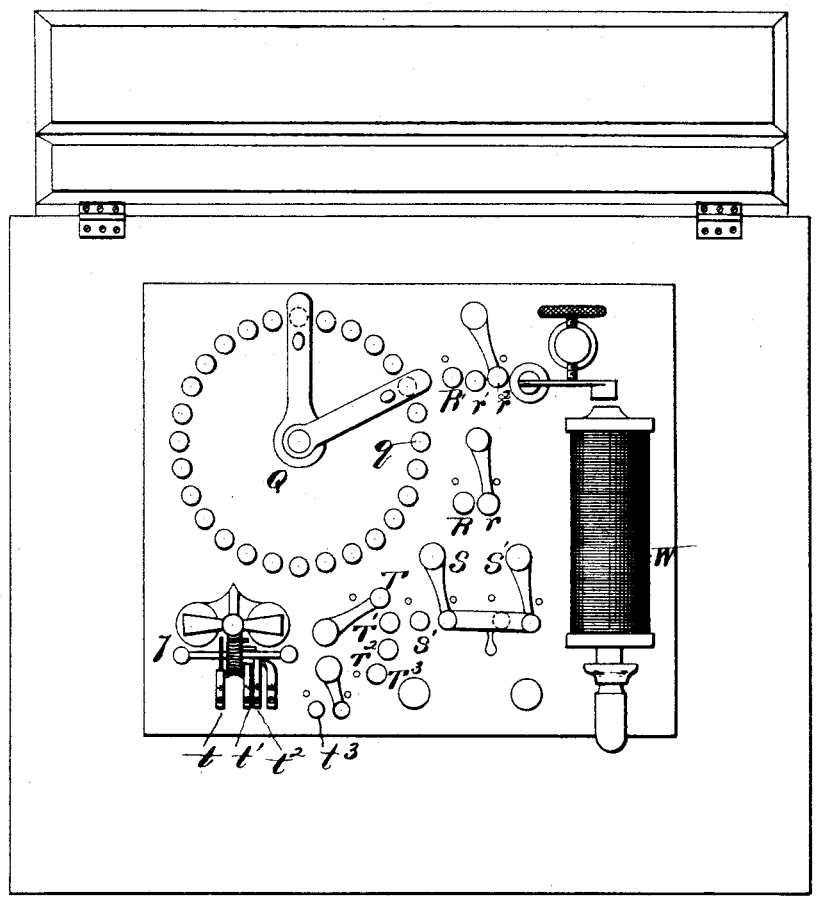
Figure 3:
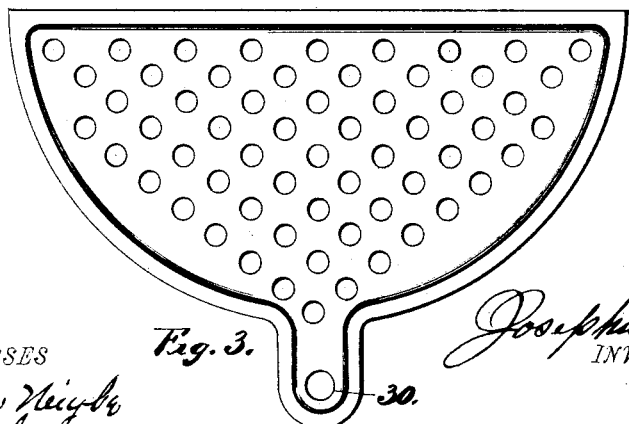
Figure 9:
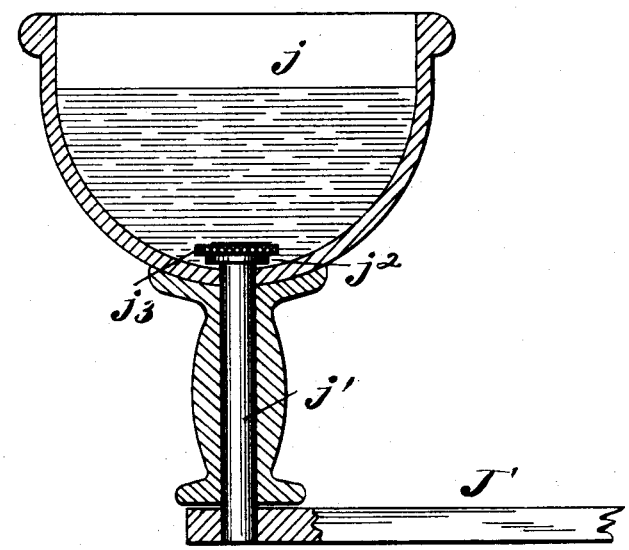
Figure 10:
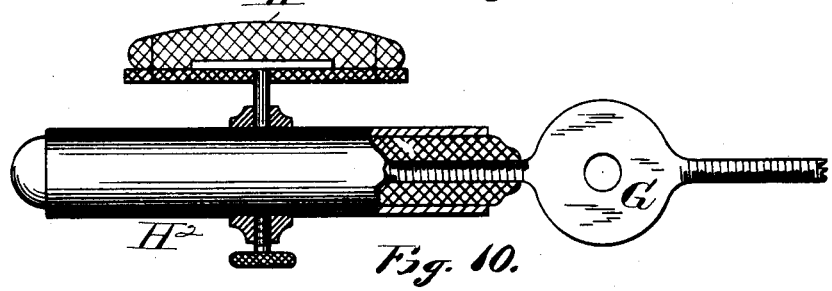
Figure 11:
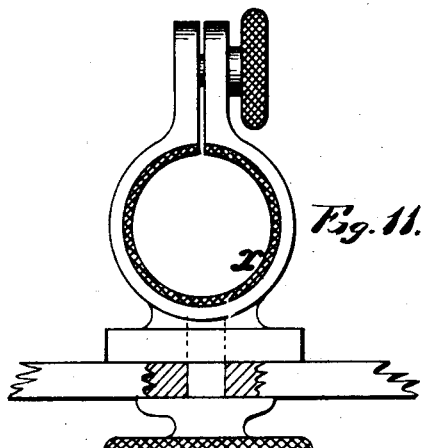

Figure 1 represents the front of the cabinet. Fig. 2 represents the top of the cabinet. Fig. 3 represents a simple form of stool. Fig. 4 shows my multiple induction-coil and its leading-out wires. Figs. 5, 6, and 7 show my regulating current-breaker, by means of which I am enabled to regulate the rapidity of succeeding impulses of electricity. Fig. 8 shows a detail of my contact-pad for local treatment of the back or other parts of the body. Figs. 9, 10, and 11 show details of parts shown assembled on Fig. 12. Fig. 12 shows the method of employing the appliance, and Fig. 13 shows a modification of the upright standards.

On the front of the cabinet B is a vertical standard A. Upon the standard A are a number of arms held adjustably to the standard by split rings and binding-screws, (a detail is shown in Fig. 11,) the ring in each case being insulated by an interior lining X of insulating material. To the ring G are attached two horizontal arms $H^2$ $H^3$, arranged to support two hand-rests H H', each hand-rest being provided on its upper surface with a cushion of sponge or other similar material of such a nature that the electric current passing to the patient is diffused by the moist cushion over the part under treatment. G' supports a curved arm, bearing a cross-arm and adjustable cushions arranged and adapted for local treatment of the back, a detail of the cross-arm $I^3$ showing the adjustable contact-cushions I' $I^2$, and the spring connecting-joint $i$ between the cross-arm $I^3$ and the arm I is shown in Fig. 8.

The arm I turns on the shank of the thumb-nut holding it to the ring G', and is supported at any desired inclination by means of the brace $i'$ and ring $G^3$. A sliding joint $i$, distended by an inclosed spring, connects the cross-arm $I^3$ to the curved arm I, and causes the cushions I' $I^2$ to adjust themselves with an even pressure on uneven surfaces of the body. From the ring $G^2$ rises the arm J, carrying the cross-arm J' $J^2$, one of which supports a cup $j$ and the other an electric light L. The cup $j$ is supported on an insulating-handle $j'$.

Across the bottom of the standard is a cross-rod K, supporting the foot-rests $h\,h$, for furnishing an electrical contact to the under surface of the feet.

Each of the contact-pieces is furnished with suitable means for attaching a current-wire to it. The stool or seat is also furnished with a suitable means for being placed in the circuit, as the binding-post 30, and thus when wired, the patient sitting upon the stool and having the part under treatment in contact with the appropriate cushion or contact-piece receives the current through the body. Of course, when preferable, the stool may be thrown out of circuit and the circuit may be completed through two of the contact-pieces and that portions of the body or limbs reaching between them.

The method of using the various parts, except the cup $j$, is obvious from the drawings, and it is obvious that the operator can arrange the conducting-wires so that the current of electricity will pass through only the part of the body which it is desired to treat.

The cup $j$ is to be used in treating depending portions of the body. It is a cup of non-conducting material, preferably soft rubber, into the bottom of which is a terminal $j^2$, covered by a button $j^3$, which protects the body from actual contact with the terminal, while it permits it to receive the current through the contained water or fluids with which the cup is partly filled when in use.

In order that I may use the kind of current applicable to any particular case, and may regulate the rapidity of the successive impulses of the current, I employ the multiple induction-coil shown in detail in Figs. 5, 6, and 7. The wiring of the apparatus is concealed within the cabinet, and I have indicated only that which is peculiar to my multiple induction-coil, inasmuch as the wiring necessary for the switch-board will at once be evident when the use of the various contact-posts is declared. The switch-board is in part shown on Fig. 2 and in part indicated on Fig. 4. That shown on Fig. 2 is used for the purpose of regulating the strength and controlling the polarity of the current and the rapidity of the successive impulses employed. The switch-board shown on Fig. 4 is used to enable me to employ a current of such strength, whether primary or first, second, third, or fourth induced or secondary current, as I may desire, or as may be deemed most applicable to the case under treatment.

The induction-coil is shown in Fig. 4, and it consists of a primary and four secondary coils, one end of each of the latter being connected with the primary coil to regulate or increase the force of the current passing therethrough.

On the switch-board shown at Fig. 2 the contact-posts Q $q$ $q$, &c., arranged in a circle, are the same as those ordinarily used to place in circuit one or more of the several cells of the battery, while R $r$ switch into the circuit the coil and Wagner hammer. R $r'$ $r^2$ are respectively used in giving a plain galvanic current, a primary current through the coil, and a first-induced current. S S' change the polarity or direction of the current, $t^3$ switches the motor 7 into the circuit, while the rapidity of the successive impulses is regulated by the posts T' T$^2$ T$^3$, which are wired, respectively, to the contact-springs $t$ $t'$ $t^2$.

The rapidity of the successive impulses is regulated by the motor 7. (The details are shown in Figs. 5, 6, and 7.) This is a motor in which the rapidly-revolving armature 8, through the worm and wheel 9, produces a comparatively slow motion of the worm-wheel 9. The current passes through the wheel 9 and passes out through the ends of the teeth 10 or through the pins 11, or through the pins 12 to the proper contact-spring $t$ $t'$ $t^2$, passing to that one of the contact-springs which is in circuit through the posts T', T$^2$, or T$^3$, thus giving at each revolution of the worm-wheel a number of impulses corresponding to the number of times the current has been interrupted. All these variations in the current are or may be carried through the second switch-board, Fig. 4, so that they may be employed with an induced current of increased or diminished strength.

In Fig. 12 the method of applying the contact-pieces to a person under treatment is shown.

In Fig. 13 is shown a modified form in which the external wiring from binding-posts 15 20 to the various arms, carrying contact-pieces, is omitted. In this modified form there are two upright standards $a$ $a'$, connecting directly to the binding-posts 15 20, and on these posts $a$ $a'$ the arms are mounted directly by means of the split rings $g$ $g'$ $g^2$, &c. In this form, however, the interior insulating-ring X is omitted, and the metallic ring presses directly upon the metallic standard and becomes a part of the conductor. Another modification employed with this form is to make all the connections $g$ $g'$ $g^2$, &c., universal joints. The joints G' G$^3$ in the first form described are also universal.

While I have thus shown standards and arms adapted to reach nearly every part of the body, I do not wish to be limited to either the number or form of any of those shown, the object of the invention being to produce an apparatus in which the curative powers of electricity may be easily and readily applied, and in which, especially, I may employ the induced electricity of varying strength, as I have explained.

Having thus described my invention, what I claim as novel, and desire secured to me by Letters Patent, is—

1. In an apparatus of the kind described, the combination, with a standard, of a curved arm I, adjustably connected to the standard, cross-arms on the end of the arm, a spring-joint connecting the same, contact-cushions on the cross-arms, and a brace $i'$ below the arm, substantially as described.

2. In an apparatus of the kind described, the combination, with a vertical standard, of an arm J, adjustably secured thereon, a cup on the arm, formed of insulated material, a terminal $j^2$ in the bottom thereof, a button on the terminal, and means for supplying a current to the terminal, substantially as described.

3. In an apparatus of the kind described, a standard, the horizontal arms H$^2$ H$^3$, adjustably secured thereon, contact-cushions adjustably secured on the arms, the curved arm I, having cross-arms yieldingly connected therewith, the arm J, having cross-arms, an electric light on one and an insulated cup on the other cross-arm, and means for supplying an electric current to the several points, substantially as described.

4. In an apparatus of the kind described, the combination, with a battery and induction-coil, of a motor to regulate the impulses, consisting of magnets, a revolving armature, a worm-gear, a gear-wheel having laterally-projecting pins on its sides of varying length, and contact-springs for engaging the projections, substantially as described.

5. In an apparatus of the kind described, the combination, with the standard and arms, of insulated split rings surrounding the standard and supporting the arms, and set-screws for drawing the split ends of the rings together, substantially as described.

6. In an electric medical apparatus, the combination, with the terminals for local application, of an induction-coil consisting of a primary coil in circuit with a battery and a series of secondary coils receiving induced currents from the primary coil, means for regulating the impulses, and switches between the connections of the terminals and respective coils, whereby currents of different strengths may be utilized, substantially as described.

7. In an apparatus of the kind described, the combination, with the terminals for local application, of a primary coil, a battery, one or more secondary coils receiving induced currents from the primary coil, a motor for regulating the impulses, and suitable switches, substantially as described.

8. In an electric medical apparatus, the combination, with the terminals for local application, of an induction-coil consisting of a primary coil in circuit with a battery, and a series of secondary coils receiving induced currents from the primary coil, connections between the primary and secondary coils, and switches between the respective coils and the terminal connections, substantially as described.

JOSEPHUS C. CHAMBERS.

Witnesses:
    WILLIAM A. HIGBE,
    ALBION P. GOWMAN.